US012611068B2

(12) United States Patent
Liu et al.

(10) Patent No.: US 12,611,068 B2
(45) Date of Patent: Apr. 28, 2026

(54) SHOWER DOOR SYSTEM

(71) Applicant: KOHLER CO., Kohler, WI (US)

(72) Inventors: Xinyao Liu, Milwaukee, WI (US); Brian M. Kaule, Sheboygan, WI (US); He Kun, Guangdong (CN)

(73) Assignee: KOHLER CO., Kohler, WI (US)

(*) Notice: Subject to any disclaimer, the term of this patent is extended or adjusted under 35 U.S.C. 154(b) by 218 days.

(21) Appl. No.: 18/552,329

(22) PCT Filed: Mar. 29, 2022

(86) PCT No.: PCT/CN2022/083783
§ 371 (c)(1),
(2) Date: Sep. 25, 2023

(87) PCT Pub. No.: WO2022/206776
PCT Pub. Date: Oct. 6, 2022

(65) Prior Publication Data

US 2024/0172898 A1 May 30, 2024

Related U.S. Application Data

(60) Provisional application No. 63/167,779, filed on Mar. 30, 2021.

(51) Int. Cl.
*E05D 7/081* (2006.01)
*A47K 3/34* (2006.01)

(52) U.S. Cl.
CPC ................ *A47K 3/34* (2013.01); *E05D 7/081* (2013.01); *E05Y 2600/502* (2013.01); *E05Y 2900/114* (2013.01)

(58) Field of Classification Search
CPC ............ E05D 7/081; E05D 2005/0261; E05D 2005/0246; E05D 5/0246
USPC .............................................................. 4/607
See application file for complete search history.

(56) References Cited

U.S. PATENT DOCUMENTS

| | | | |
|---|---|---|---|
| 1,817,330 | A | 8/1931 | Wilson, Jr. |
| 2,579,393 | A | 12/1951 | Modrey |
| 4,041,964 | A | 8/1977 | Shamoon |
| 4,243,184 | A | 1/1981 | Wright |

(Continued)

FOREIGN PATENT DOCUMENTS

| | | |
|---|---|---|
| CN | 101557745 | 10/2009 |
| CN | 107550365 | 1/2018 |

(Continued)

OTHER PUBLICATIONS

International Search Report on PCT/CN2022/083783 dated Jun. 23, 2023.

*Primary Examiner* — Muhammad Ijaz
*Assistant Examiner* — Susan M. Heschel
(74) *Attorney, Agent, or Firm* — Foley & Lardner LLP

(57) ABSTRACT

A pivot assembly for a shower door includes a hub, and a linkage having a first end and second end, where the first end is configured to couple to the hub. The assembly also includes a first pin connection coupled to the first end of the linkage and to a first clamp, and a second pin connection coupled to the second end of the linkage and to a second clamp, where each of the first pin connection and the second pin connection include a plurality of apertures, and where a configuration of the plurality of apertures is based on a configuration of the pivot assembly.

20 Claims, 15 Drawing Sheets

(56) References Cited

U.S. PATENT DOCUMENTS

| | | | | |
|---|---|---|---|---|
| 4,646,491 | A | 3/1987 | Munch | |
| 5,485,859 | A | 1/1996 | Johnson et al. | |
| 5,590,804 | A | 1/1997 | Crum et al. | |
| 5,867,846 | A * | 2/1999 | Paredes | E06B 3/80 4/558 |
| 6,309,035 | B1 | 10/2001 | Lye et al. | |
| 6,338,171 | B1 | 1/2002 | Dandridge | |
| 6,547,080 | B1 | 4/2003 | Guard | |
| 6,618,871 | B2 * | 9/2003 | Kopacz | E05D 7/081 4/607 |
| 6,959,461 | B1 | 11/2005 | Sanchez | |
| 7,178,675 | B2 | 2/2007 | Votel | |
| 7,568,239 | B2 | 8/2009 | Spruner von Mertz et al. | |
| 7,721,362 | B2 | 5/2010 | Martin et al. | |
| 9,574,333 | B2 | 2/2017 | O'Brien et al. | |
| 9,644,410 | B2 * | 5/2017 | Hayes | E05D 3/02 |
| 10,329,755 | B2 | 6/2019 | Zver et al. | |
| 10,337,178 | B2 | 7/2019 | Bomatter et al. | |
| 10,588,483 | B2 | 3/2020 | Keller et al. | |
| 11,193,316 | B2 * | 12/2021 | Davis | E05D 5/06 |
| 2008/0148475 | A1 | 6/2008 | Lin | |
| 2013/0312176 | A1 | 11/2013 | Yencho | |
| 2015/0113724 | A1 * | 4/2015 | Corpuz, Jr. | E05D 7/12 4/607 |
| 2016/0208531 | A1 | 7/2016 | Corpuz et al. | |
| 2018/0030704 | A1 | 2/2018 | Bomatter et al. | |
| 2018/0334840 | A1 * | 11/2018 | Corpuz, Jr. | E05F 1/061 |

FOREIGN PATENT DOCUMENTS

| | | |
|---|---|---|
| FR | 2300534 | 7/1977 |
| FR | 2559197 | 5/1986 |

* cited by examiner

SHOWER DOOR SYSTEM

CROSS-REFERENCE TO RELATED APPLICATIONS

This application is a U.S. national phase application under 35 U.S.C. § 371 of International Application No. PCT/CN2022/083783, filed on Mar. 29, 2022, which claims priority to U.S. Provisional Application 63/167,779, filed on Mar. 30, 2021, the entire disclosures of which are incorporated herein by reference in their entireties, for any and all purposes.

BACKGROUND

The present disclosure relates generally to a shower door system, and more specifically to a shower door system having an adjustable mounting assembly for shower doors.

Mounting assemblies for shower doors, and particularly glass shower doors, are frequently stationary assemblies configured to mount specific, singular shower door configurations. Accordingly, minor adjustments to or variations in shower door placement relative to adjacent fixtures or other shower panels frequently require implementation of different various shower assemblies or systems specifically configured to accommodate the corresponding shower door arrangement.

Accordingly, it would be advantageous to provide a shower door system that provides stability and is adjustable and adaptable to accommodate mounting of a shower door within a shower space in various configurations.

SUMMARY

One aspect of the present disclosure relates to a pivot assembly for a shower door. The assembly includes a hub a linkage having a first end and second end, where the first end is configured to couple to the hub. The assembly also includes a first pin connection coupled to the first end of the linkage and to a first clamp, and a second pin connection coupled to the second end of the linkage and to a second clamp, where each of the first pin connection and the second pin connection include a plurality of apertures, and where a configuration of the plurality of apertures is based on a configuration of the pivot assembly.

In various embodiments, the plurality of apertures includes four apertures. In some embodiments, two of each of the four apertures are configured to respectively receive a fastener. In other embodiments, the four apertures are arranged in two pairs, wherein a first of the two pairs are aligned along a first axis and a second of the two pairs are aligned along a second axis. In yet other embodiments, an angle between the first axis and the second axis corresponds to the configuration of the pivot assembly. In various embodiments, the hub is configured to receive a rod, the rod configured to anchor the pivot assembly to a structure. In some embodiments, the first end of the linkage includes an elongated portion extending toward the hub, the elongated portion configured to couple to a bottom portion of the hub. In other embodiments, the assembly also includes one or more bearings disposed at a joint formed between the hub and the elongated portion. In yet other embodiments, a bottom portion of the first end of the linkage includes a recess, where the recess is configured to receive the first pin connection. In various embodiments, the recess includes one or more notches, where the one or more notches are configured to engage with a flange of the first pin connection.

Another aspect of the present disclosure relates to a shower system. The shower system includes a rod extending between a first structure and a second structure and a pivot assembly coupled to the rod. The pivot assembly includes a hub, and a linkage having a first end and second end, where the first end is configured to couple to the hub. The pivot assembly further includes a first pin connection coupled to the first end of the linkage and to a first clamp, and second pin connection coupled to the second end of the linkage and to a second clamp. The shower system also includes a panel coupled to the first structure and to the second clamp, and a door coupled to the first clamp, where the door is configured to pivot relative to the panel.

In various embodiments, the panel is coupled to the first structure along a first edge and to the second clamp along a second edge, and where the first edge is disposed substantially perpendicular to the second edge. In other embodiments, the pivot assembly is configurable according to a first configuration or a second configuration, where when the pivot assembly is in the first configuration a third edge of the panel opposite the first edge at least partially overlaps a first edge of the door, and where when the pivot assembly is in the second configuration the third edge of the panel is disposed adjacent to the first edge. In yet other embodiments, each of the first pin connection and the second pin connection include a plurality of apertures, and where a configuration of the plurality of apertures is based on whether the pivot assembly is configured in the first configuration or the second configuration. In various embodiments, the system also includes a seal assembly, the seal assembly having a first portion coupled to a second edge of the door opposite the first edge and a second portion coupled to the first structure. In various embodiments, the first portion includes a first magnetic member and the second portion comprises a second magnetic member, where the first magnetic member is configured to couple to the second magnetic member. In some embodiments, the rod includes a first portion and a second portion, the first portion being coupled to a first connection on the hub and the second portion being coupled to a second connection on the hub. In other embodiments, the system also includes a mounting plate configured to couple to the first structure, where the first portion of the rod is configured to couple to the mounting plate. In yet other embodiments, the mounting plate includes a post, where the post is received by an end of the first portion of the rod. In various embodiments, the system also includes a cover, the cover configured to enclose the mounting plate.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure is directed to a shower system, which includes a pivot assembly to facilitate adjustability and improve stability compared to the conventional shower door assembly. According to one aspect of the present disclosure, the pivot assembly is configured to couple to an uppermost portion of a shower door. The pivot assembly includes a header connection hub configured to enable adjustable coupling of a shower door to a header rod, a first clamp configured to fixedly connect to the shower door and rotate relative to the header connection hub, a second clamp fixedly connected to an adjacent shower panel, and a stabilizer linkage rotatably coupled between the first and second clamps.

In various embodiments, the header connection hub of the pivot assembly includes an elongated thread length and corresponding thread coupling to enable adjustability (i.e., in a horizontal direction) relative to the header rod. In various embodiments, the stabilizer bar is disposed substantially parallel to the header rod. In various embodiments, the pivot assembly includes one or more lock screws to facilitate locking a position of the connection hub relative to the header rod. In various embodiments, header connection hub may include one or more damping mechanisms to facilitate controllable rotation/pivot at the connections to the first and/or second clamps. In various embodiments, the pivot assembly is configured to adapt for mounting the shower door and the adjacent panel such that the shower door and the adjacent panel do not overlap. In various embodiments, the pivot assembly is configured to adapt for mounting the shower door and adjacent panel such that the shower door and adjacent panel overlap. In various embodiments, the pivot assembly is configured to enable the shower door to open to an angle of 90 degrees relative to a closed position when rotated to be in an open position. In other embodiments, the pivot assembly is configured to enable the shower door to open to an angle of 105 degrees.

Figure 1:
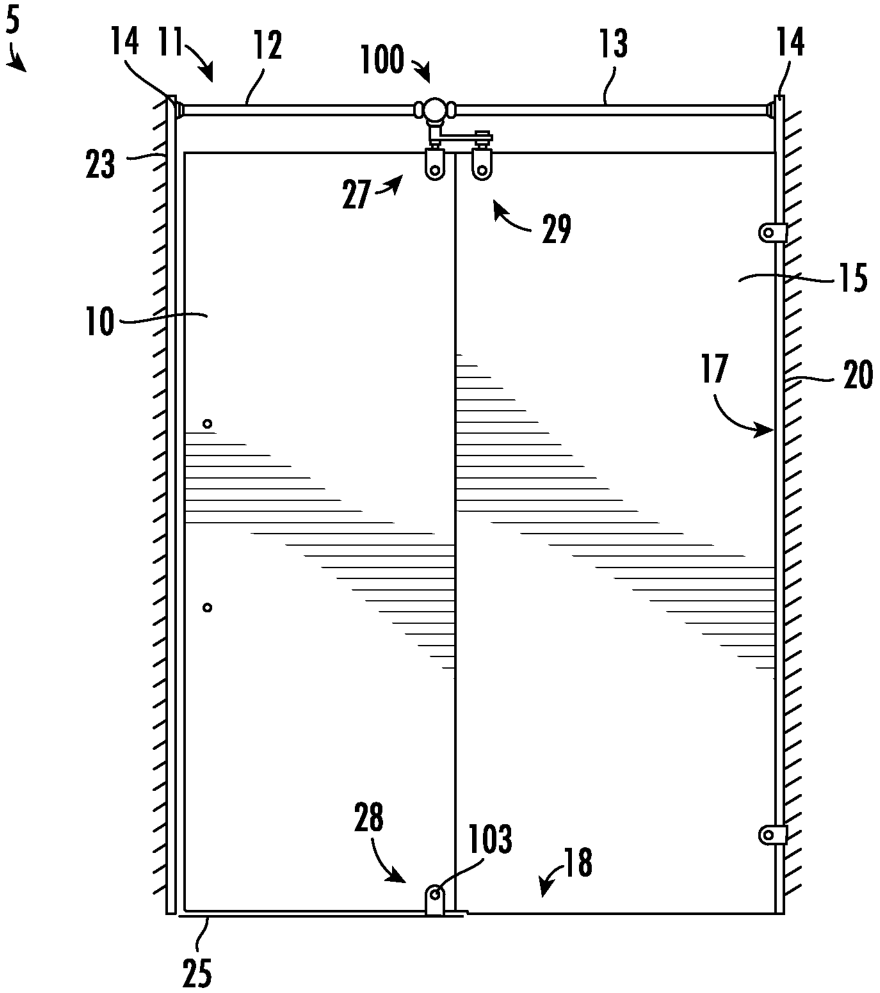
FIG. 1 is a front view of a shower door system for a shower door within a shower space, according to an exemplary embodiment.

Referring to FIG. 1, a front view of a shower door system 5 is shown, according to an exemplary embodiment. The shower door system 5 includes a shower door 10, which is disposed adjacent to a panel 15 within a shower space. The panel 15 is coupled to a first fixture 20 (e.g., wall) along a first edge 17 and coupled to a second fixture 25 (e.g., floor) perpendicular to the first fixture 20 along a second edge 18 perpendicular to the first edge 17. The shower door 10 is mounted at an upper portion 27 and a lower portion 28 via a pivot assembly 100 and a rotatable clamped coupling 103, respectively. The rotatable clamped coupling 103 is configured to couple the lower portion 28 to the second fixture 25 such that the clamped coupling 103 is fixedly connected to the door 10 and rotatably coupled to the second fixture 25. The pivot assembly 100 is further rotatably coupled to an upper portion 29 of the panel 15. The pivot assembly 100 is configured to rotatably couple the upper portion 27 of the shower door 10 to a header rod 11, which is formed by a first portion 12 and a second portion 13. The header rod 11 is configured to fixedly couple to the first fixture 20 and a third fixture 23 (e.g., wall) disposed opposite and substantially parallel to the first fixture 20. As shown in FIG. 1, the header rod 11 is coupled to the first and third fixtures 20 and 23 via mounting assemblies 14. When mounted, the door 10 is configured to rotate relative to the panel 15 as facilitated by the clamped coupling 103 and the pivot assembly 100.

Figure 2:
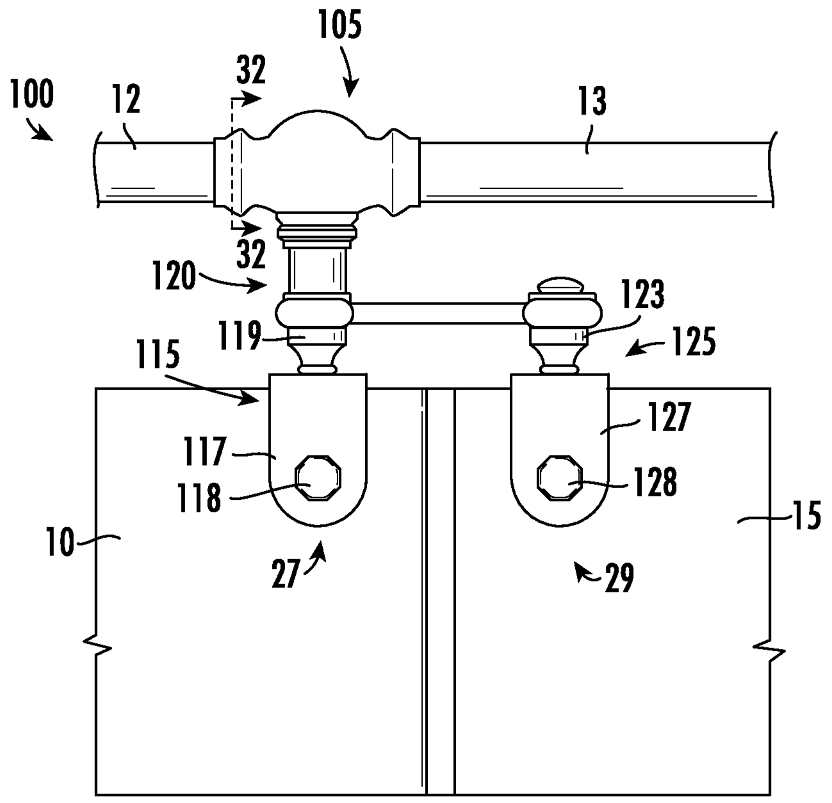
FIG. 2 is a front view of a pivot assembly within the shower door system of FIG. 1, according to an exemplary embodiment.

FIG. 2 shows a front view of the pivot assembly 100, according to an exemplary embodiment. As shown, the pivot assembly 100 includes a header connection hub 105 configured to receive first and second portions 12 and 13 of the header rod 11, which threadably engage with the header connection hub 105. The pivot assembly 100 further includes a first clamp 115 and second clamp 125, which are rotatably connected via a linkage 120 ("stability bar"). Specifically, the linkage 120 is rotatably coupled between a first pin connection 119, which is connected to the first clamp 115, and second pin connection 123, which is connected to the second clamp 125. The linkage 120 is further rotatably coupled between the first pin connection 119 and the header connection hub 105. Accordingly, the linkage 120 may rotate relative to the header connection hub 105, the first clamp 115 (i.e., via the first pin connection 119), and the second clamp 125 (i.e., via the second pin connection 123). During operation, the door 10 may be opened by rotating about the first pin connection 119, wherein the linkage 120 may further rotate about the first pin connection relative to the first clamp 115.

As shown in FIG. 2, each of the first and second clamps 115 and 125 include parallel clamp portions 117 and 127, respectively. The clamp portions 117 and 127 are configured to respectively receive upper portions 27 (of the door 10) and 29 (of the panel 15). The door 10 and panel 15 may be fixed to the clamp portions 117 and 127 via one or more fasteners 118 and 128 (e.g., bolt, pin, etc.), respectively. In various embodiments, each of the door 10 and panel 15 may include one or more apertures disposed therein (e.g., notch) or therethrough (e.g., through hole), which are configured to receive the one or more fasteners 118 and 128, respectively.

Figure 3:
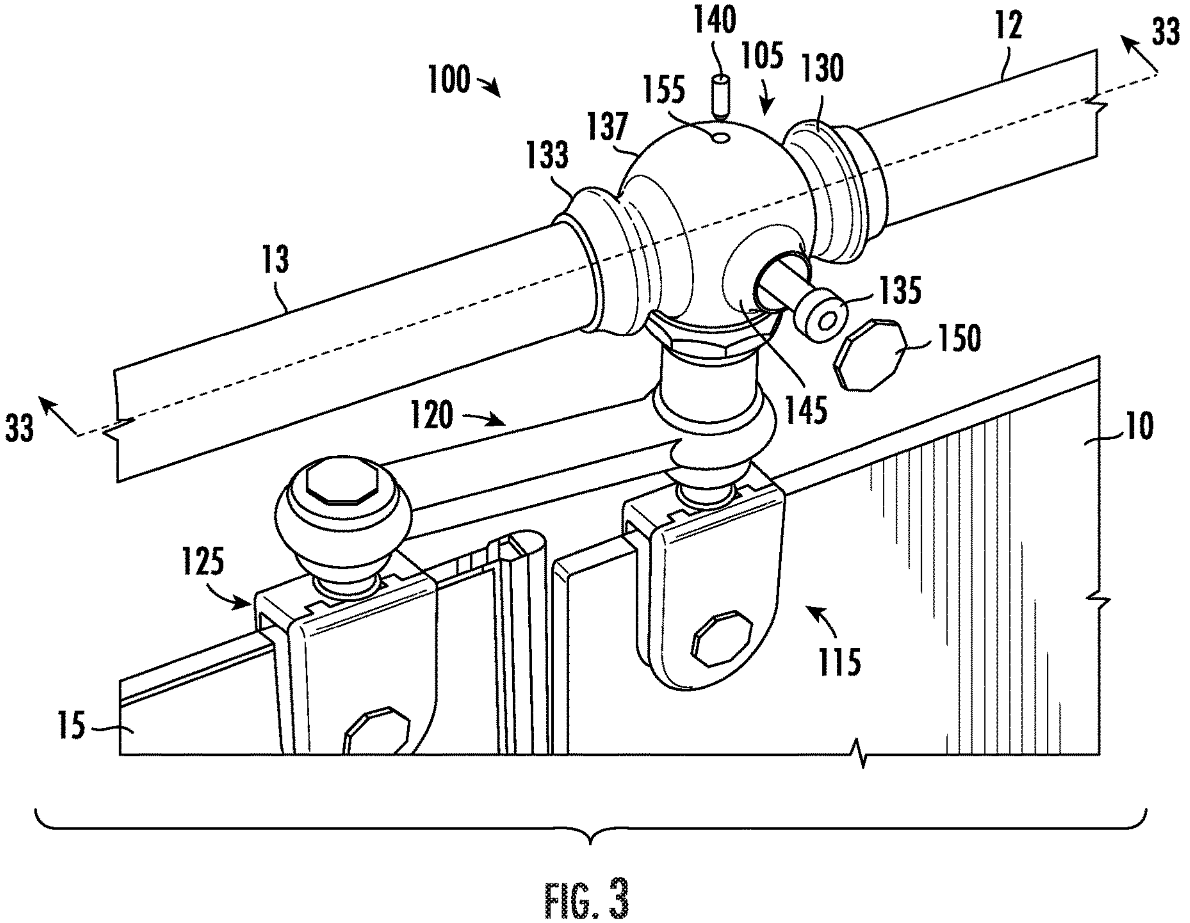
FIG. 3 is a rear perspective exploded view of the pivot assembly of FIG. 2, according to an exemplary embodiment.

In various embodiments, a width of at least one of the door 10 and panel 15 may be customized to adapt to particular shower space and/or based on a user preference. To accommodate width variations of the door 10 and/or panel 15, a horizontal position of the header connection hub 105 may be adjusted. As shown in FIG. 3, which illustrates a rear perspective exploded view of the pivot assembly 100, the header connection hub 105 includes a main body 137, which is configured to receive first and second portions 12 and 13 of the header rod 11. As shown, the main body 137 includes a first threaded connection portion 130 and a second threaded connection portion 133 disposed on an opposite side of the main body 137. The first threaded connection portion 130 is configured to threadably engage with the first portion 12 of the header rod 11 and the second threaded connection portion 130 is configured to threadably engage with the second portion 13 of the header rod 11. The first and second threaded connection portions 130 and 133 may be elongated in the horizontal direction. Accordingly, each of the first and second portions 12 and 13 of the header rod 11 may be threaded respectively into the first and second threaded connection portions 130 and 133 in varying amounts such that the horizontal position of the header connection hub 105 may be adjusted. For example, if the first portion 12 of the header rod 11 is threaded further into the first threaded connection portion 130 as compared to the second portion 13 of the header rod 11, which may be threaded less into the second threaded connection portion 133, the horizontal position of the header connection hub 105 will be biased toward the third fixture 23. Conversely if the second portion 13 of the header rod 11 is threaded further into the second threaded connection portion 133 as compared to the first threaded portion 12 of the header rod 11, which may be threaded less into the first threaded connection portion 130, the horizontal position of the header connection hub 105 will be biased toward the first fixture 20. In various embodiments, horizontal adjustment of the header connection hub may not be necessary to accommodate the door 10 and the panel 15. In such embodiments, both the first and second portions 12 and 13 of the header rod 11 may be maximally threaded into each of the first and second threaded connection portions 130 and 133, respectively. Accordingly, the elongated disposition of each of the first and second threaded connection portions 130 and 133 may prevent bending of the header rod 11 (i.e., at the joints formed by either of the first portion 12 and the first threaded connection portion 130 or the second portion 13 and the second threaded connection portion 133).

Figure 4:
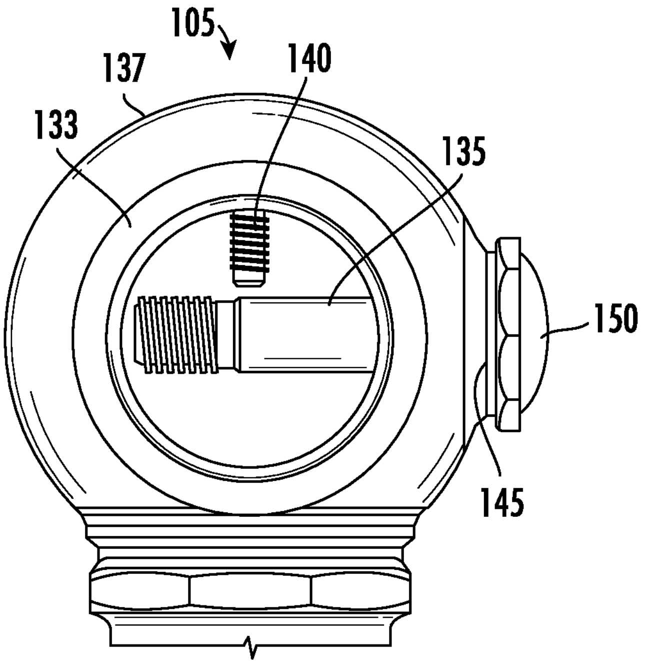
FIG. 4 is a side cross-sectional view of the pivot assembly of FIG. 2 taken along line 32-32 of FIG. 2, according to an exemplary embodiment.

As shown in FIG. 3, the pivot assembly 100 includes one or more threaded lock screws 135, which may be configured to facilitate coupling of the header connection hub 105 to the first pin connection 119. As shown, the one or more threaded lock screws 135 may be threaded into the main body 137 of the header connection hub via one or more corresponding connection portions 145. Although FIG. 3 shows the connection portion 145 disposed on a rear side of the main body 137, the connection portion 145 may alternatively be disposed on a front, top, or other side of the main body 137. In various embodiments, the one or more threaded lock screws 135 may be further configured to provide mechanical support and reduce wobbling within the pivot assembly 100. As shown, the header connection hub 105 may further include one or more covers 150, which may be coupled corresponding one or more connection portions 145 and configured to conceal one or more threaded locks screws 135. In addition, the pivot assembly 100 may also include one or more threaded lock nuts 140, which may be fastened within one or more corresponding threaded holes 155. The one or more threaded lock nuts 140 may be configured to prevent buckling within the pivot assembly 100 (i.e., of the header connection hub 105 and the first and second portions 12 and 13 of the header rod 11). FIG. 4 shows a cross-sectional view of the header connection hub 105 taken along line 32-32 of FIG. 2 and illustrates relative positioning of the threaded lock nut 140 and the threaded lock screw 135 when each are fully threaded into the main body 137 of the header connection hub 105.

Figure 5:
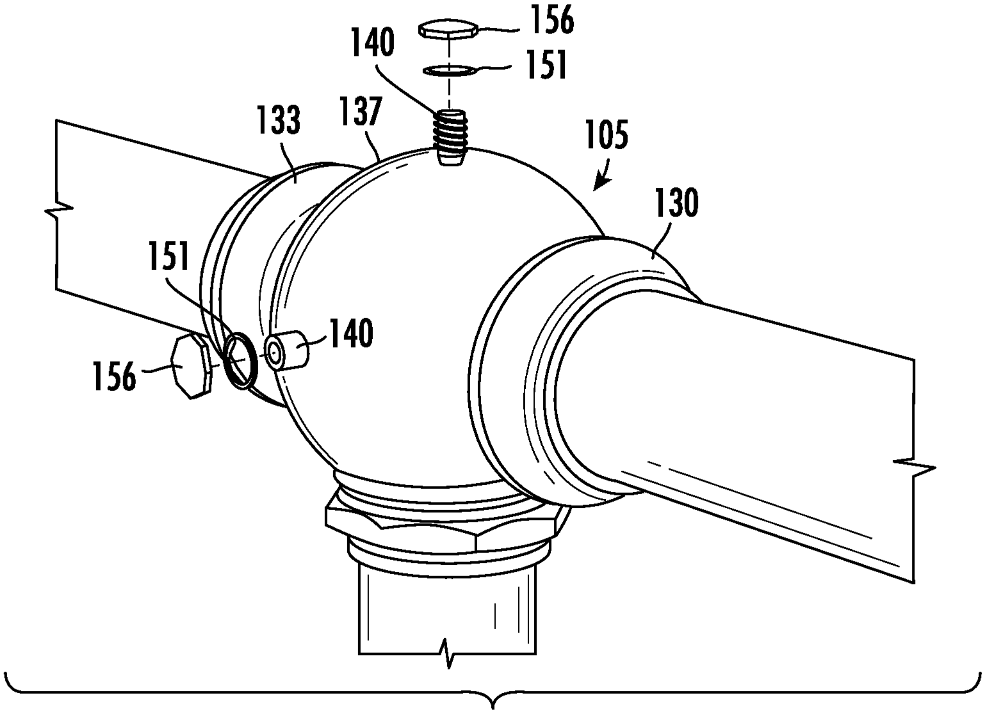
FIG. 5 is a front perspective exploded view of the pivot assembly, according to an exemplary embodiment.

In various embodiments, the header connection hub 105 may include a threaded lock nut 140 disposed on each of a top and a side region of the main body 137. FIG. 5 shows a front exploded perspective view of the header connection hub 105, according to an exemplary embodiment. As illustrated, the main body 137 of the header connection hub 105 may be configured to receive a threaded lock nut 140 within each of a top and side region of the main body 137 to prevent bend within the pivot assembly and provide structural support. As shown, each of the threaded lock nuts 140 may be concealed with corresponding covers 156, which may be coupled to the main body 137 after the threaded lock nuts 140 are fully threaded into the main body 137. The header connection hub 105 may also include one or more gaskets 151, which may be disposed between the covers 156 and the main body 137. The gaskets 151 may be configured to prevent water, moisture, or debris from contacting the threaded lock nuts 140 and causing corrosion or other degradation therein.

Figure 6:
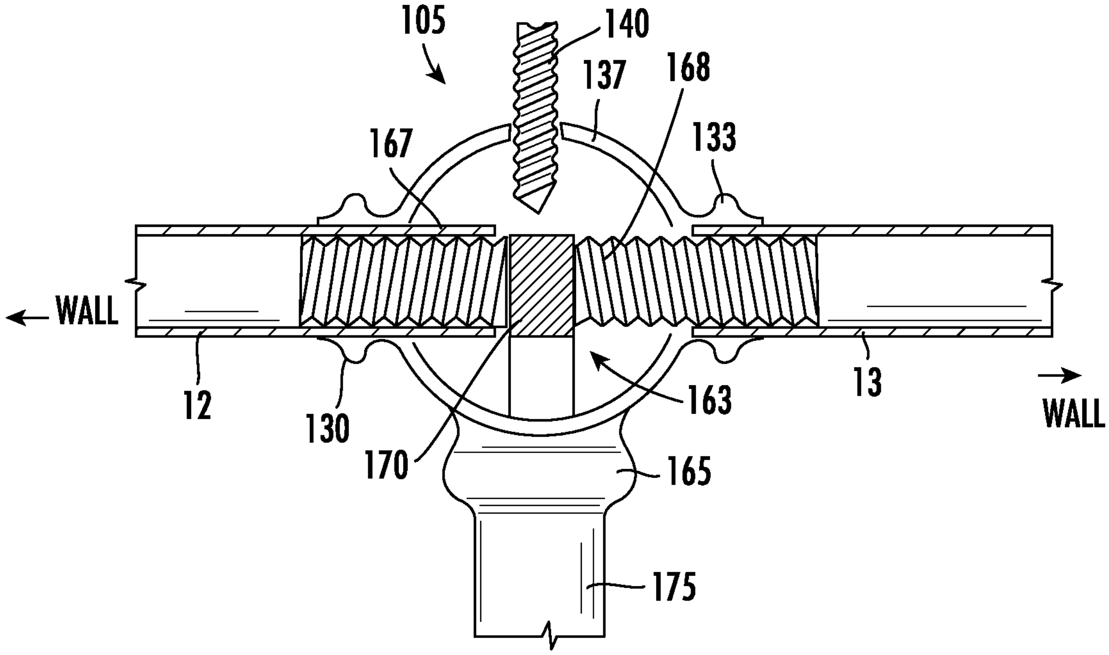
FIG. 6 is a side cross-sectional view of the pivot assembly of FIG. 2 taken along line 33-33 of FIG. 3, according to an exemplary embodiment.

FIG. 6 shows a cross-sectional view of the header connection hub 105 taken along line 33-33 of FIG. 3, according to an exemplary embodiment. As illustrated, the header connection hub 105 includes a bottom connection portion 165, which may be configured to engage with the first pin connection 119 to secure the header connection hub 105 thereto. As shown, the header connection hub 105 includes a threaded T-nipple disposed within the main body 137. During installation of the pivot assembly 100, the first portion 12 of the header rod 11 may be threaded into the first threaded connection portion 130 via the first threaded region 167 of the T-nipple 163. The second portion 13 of the header rod 11 may also be threaded into the second threaded connection portion 133 via the second threaded region 168 of the T-nipple 163. Each of the first and second portions 12 and 13 may be partially unthreaded from the main body 137 to adjust an overall length of the header rod 11 and/or to adjust a horizontal position of the header connection hub 105. As illustrated, the threaded lock nut 140, which may be configured to thread into a top portion of the main body 137, may be threaded into a locking component 170, which may secure the first and second portions 12 and 13 of the header rod 11. The threaded lock nut 140 may also stabilize the header rod 11 and prevent wobbling of the first and second portions 11 and 12 and/or the header connection hub 105.

Figure 7A:
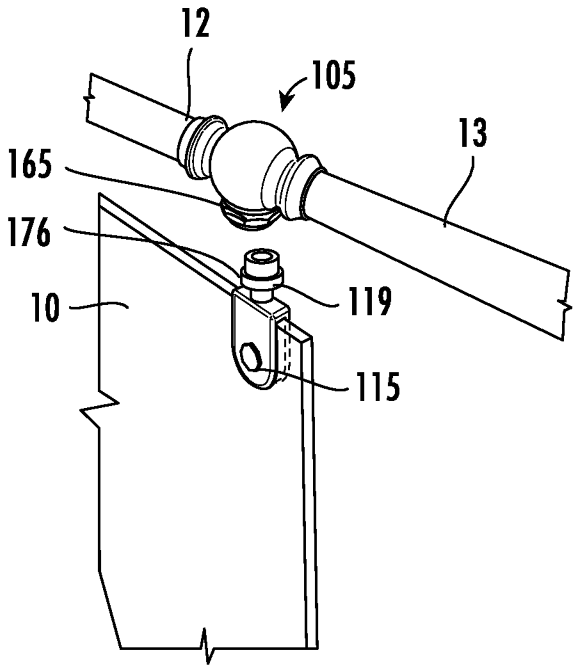
FIG. 7A is an exploded view of a first portion of the pivot assembly of FIG. 2, according to an exemplary embodiment.
Figure 7B:
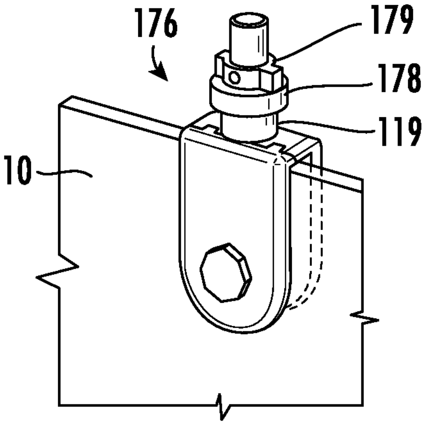
FIG. 7B is a perspective view of a pin connection within the pivot assembly of FIG. 7A, according to an exemplary embodiment.
Figure 8:
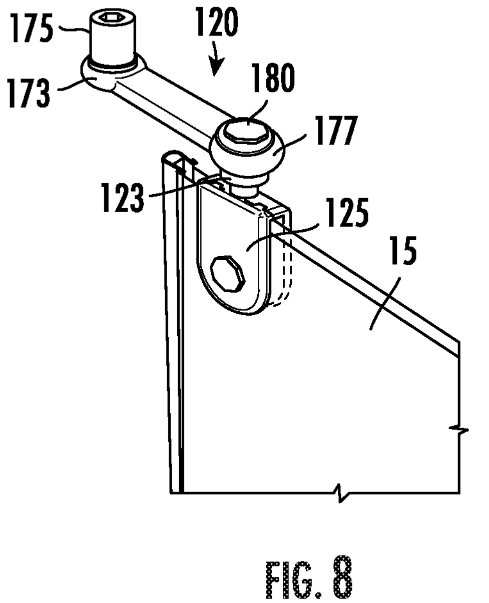
FIG. 8 is an exploded view of a second portion of the pivot assembly of FIG. 2, according to an exemplary embodiment.

FIGS. 7 and 8 show exploded perspective views of first and second portions of the pivot assembly 100, respectively, according to an exemplary embodiment. As illustrated, the linkage 120 includes a first end 173 and a second end 177, wherein the first end 173 is configured to rotably couple to the first pin connection 119 and the header connection hub 105 (i.e., via the bottom connection portion 165), and the second end 177 is configured to rotably couple to the second pin connection 123. As illustrated, the first end 173 of the linkage 120 may include an elongated portion 175, which is configured for connection between the first pin 119 and the header connection hub 105. In various embodiments, the elongated portion 175 may couple to the bottom connection portion 165 of the header connection hub 105. The first pin connection 119 may also include a ledge or lip 165, which is configured to support and engage with the elongated portion 175 of the linkage 120. As shown, the second end 177 of the linkage 120 may be configured to receive second pin connection 123 therein such that the second pin connection 123 may fit concentrically within the second end 177 of the linkage 120. As shown, the second pin connection 123 may be situated such that a top end 180 of the second pin connection 123 extends through the second end 177 of the linkage 120. In various embodiments, the pivot assembly 100 may include one or more bearings or dampers disposed within or adjacent the joints formed by at least one first pin connection 119 and the first end 173 of the linkage 120, the first end 173 of the linkage 120 and the header connection hub 105, or the second end 177 of the linkage 120 and the second pin connection 123. In various embodiments, the one or more bearings or dampers may be configured to facilitate and/or control rotation at the specified joints.

As shown in FIGS. 7A-7B, the first pin connection 119 may include one or more engagement features 176 to facilitate engagement of the first pin connection 119 with the header connection hub 105 and the elongated portion 175 of the linkage 120. In various embodiments, such as shown in FIG. 7B, the one or more engagement features 176 may include a circumferential lip 178 extending about the first pin connection 119. The one or more engagement features 176 may additionally or alternatively include a flange 179, which may be disposed near or adjacent to the pin connection 119. In some embodiments, the flange 179 may be configured to prevent disengagement between the pin connection 119 and the header connection hub 105, and/or prevent disengagement between the pin connection 119 and the elongated portion 175 of the linkage 120. In various embodiments, the lip 178 may limit sliding of the elongated portion 175 relative to the pin connection 119 along a primary axis thereof. In some embodiments, the lip 178 may be structured as a locating feature, configured to facilitate coupling and placement of the pin connection 119 and the header connection hub 105 and/or the linkage 120. In various embodiments, the pin connection 119 (i.e., the features 176) may include one or more dampers or bearings configured to facilitate and/or control rotation at the pin connection 119.

Figure 9:
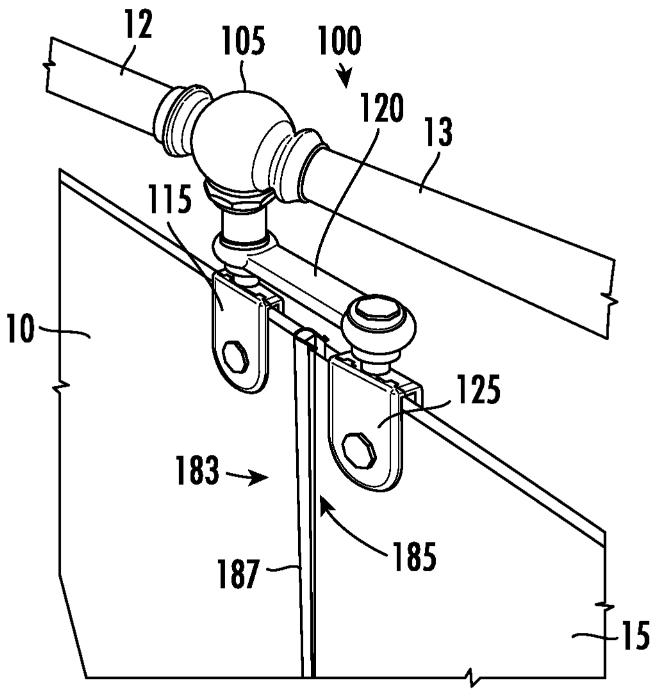
FIG. 9 is a perspective view of the pivot assembly of FIG. 2 used to mount a shower door in an adjacent configuration, according to an exemplary embodiment.
Figure 10:
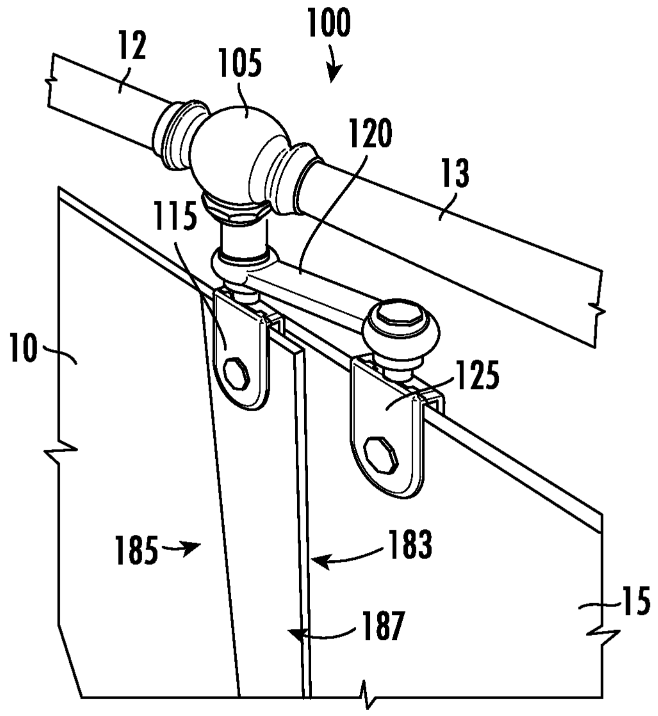
FIGS. 10 and 11 are perspective and top views, respectively, of the pivot assembly of FIG. 2 used to mount a shower door in an overlapped configuration, according to an exemplary embodiment.
Figure 11:
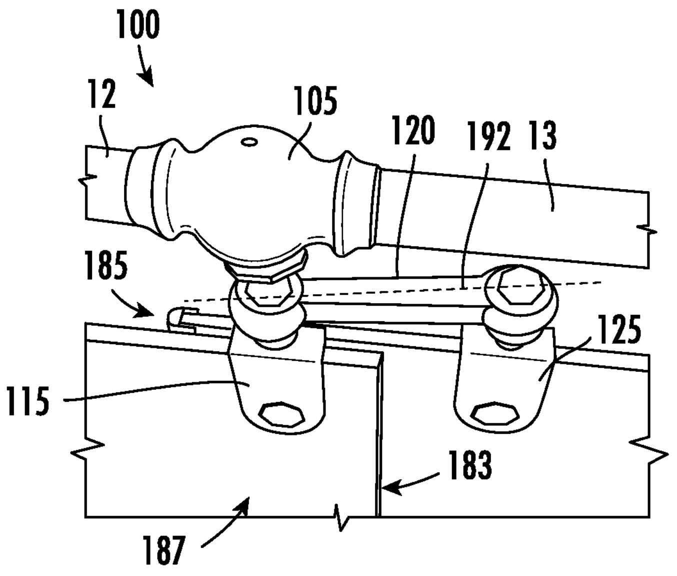

The rotatable joints formed among the first and second pin connections 119 and 123, the linkage 120, and the header connection hub 105 enable adjustability of the pivot assembly 100 and specifically, an ability to mount the shower door 10 and panel 15 in non-overlapped and overlapped configurations. FIGS. 9 and 10-11 show perspective views of the pivot assembly 100 adapted to mount the shower door 10 and panel 15 in non-overlapped (i.e., adjacent) and overlapped configurations, respectively. As illustrated in FIG. 9, the pivot assembly 100 may be coupled to the shower door 10 and panel 15 such that a vertical edge 183 of the shower door 10 is disposed adjacent or is contiguous with a vertical edge 185 of the panel 15. In various embodiments at least one of the edge 183 or the edge 185 may be fitted with a seal (e.g., a bulb seal) to prevent water or moisture from passing between the door 10 and the panel 15 when in the non-overlapped configuration. In other embodiments, the pivot assembly 100 may be adapted to mount the shower door 10 and the panel 15 in an overlapped configuration, as shown in FIG. 10. As illustrated, the pivot assembly 100 may be configured to accommodate an arrangement wherein the shower door 10 partially overlaps the panel 15 such that the vertical edge 183 of the shower door 10 extends past the vertical edge 185 of the panel 15 to form an overlap region 187 defined between the edges 183 and 185.

To adapt to mounting the shower door 10 and the panel 15 in non-overlapped and overlapped configurations, the linkage 120 of the pivot assembly may rotate relative to the first clamp 115 and the header connection hub 105. As illustrated in FIG. 9, when the shower door 10 and the panel 15 are disposed in the non-overlapped configuration, the linkage 120 of the pivot assembly 100 may be positioned to align with a plane defined by the door 10 and the panel 15. As illustrated in FIGS. 10 and 11, when the shower door 10 and the panel 15 are disposed in the overlapped configuration, the linkage 120 may be rotated based on an amount of overlap (i.e., a width of the overlap region 187) between the shower door 10 and the panel 15 and/or a distance between the first and second clamps 115 and 125.

Figure 12:
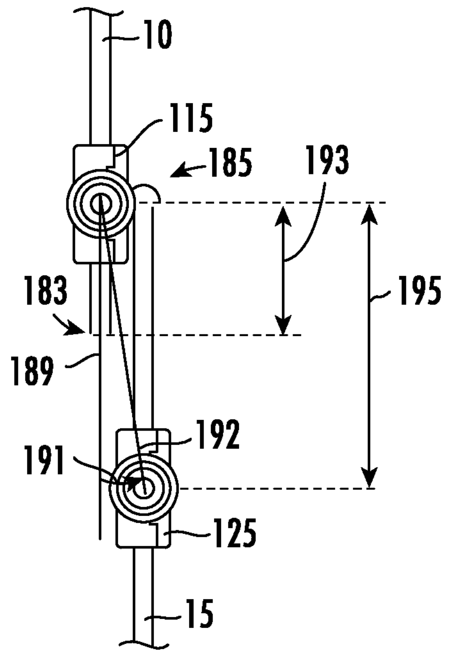
FIG. 12 is a top schematic view of the mounted shower door of FIGS. 10 and 11, according to an exemplary embodiment.

FIG. 12 shows a top schematic view of the shower door 10 and the panel 15 in an overlapped configuration. As illustrated, the door 10 and the panel 15 are arranged such that the edge 183 extends past the edge 185 (and vice versa) such that a distance 195 between the first clamp 115 and the second clamp 125 is decreased compared to when the door 10 and the panel 15 are adjacently or contiguously disposed (i.e., as in FIG. 9). In various embodiments, the distance 195 may be approximately 6.5 inches. In various embodiments, the distance 195 may be set based on a width between the first and third fixtures 20 and 23. In some embodiments, the distance 195 may be adjusted by adjust the amount of overlap between the edges 185 and 183. In various embodiments, the distance 195 may be further adjusted by adjusting at least one of a distance 193 between the first clamp 115 and the edge 183 or a distance between the second clamp 125 and the edge 185. In various embodiments, the distance 193 between the first clamp 115 and the edge 183 may be less than the distance between the second clamp 125 and the edge 185. In various embodiments, the distance 193 may be approximately 3.5 inches. In other embodiments, the distance 193 may be approximately 3 inches. Although the figures generally depict the pivot assembly 100 in a right-handed configuration, where the door 10 is configured to rotate open in a rightward direction, the pivot assembly 100 may alternatively be configured in a left-handed configuration, where the door 10 is configured to rotate open in a leftward direction.

As previously described, to accommodate the overlapped configuration of the shower door 10 and the panel 15, the linkage 120 may rotate relative to the header connection hub 105. The amount of rotation or an angle of rotation 191 of the linkage 120 may be defined between a plane 189, which is defined by the shower door 10), and a longitudinal axis 192 of the linkage 120. The angle of rotation 191 of the linkage 120 may increase with increasing overlap between the edges 183 and 185. Accordingly, the angle of rotation 191 may decrease with decreasing overlap between the edges 183 and 185 (i.e., wherein the angle of rotation 191 is 0° when the shower door 10 and the panel 15 are in the non-overlapped configuration). In various embodiments, the angle of rotation 191 may be approximately 9.3°.

Figure 13:
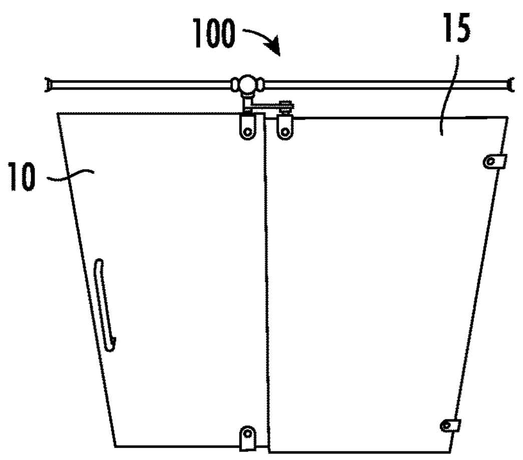
FIG. 13 is a front view of the pivot assembly of FIG. 2 used to mount a shower door, wherein the shower door is in a closed position.
Figure 14:
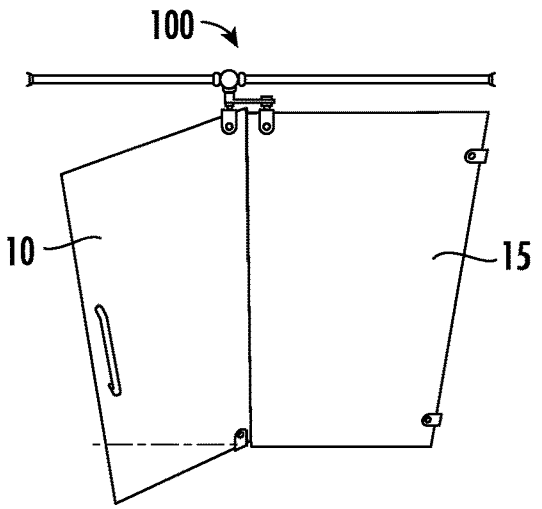
FIG. 14 is a front view of the pivot assembly of FIG. 2 used to mount the shower door of FIG. 13, wherein the shower door is in first intermediate position.
Figure 15:
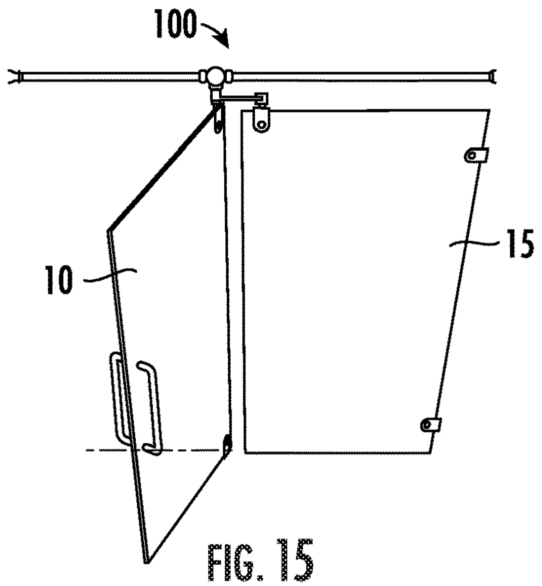
FIG. 15 is a front view of the pivot assembly of FIG. 2 used to mount the shower door of FIG. 13, wherein the shower door is in a second intermediate position.
Figure 16:
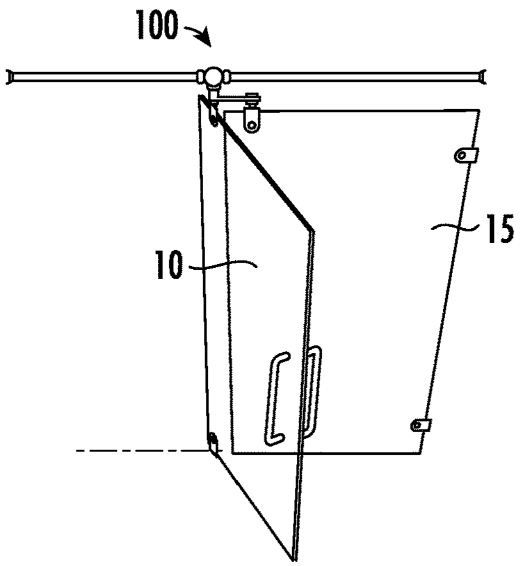
FIG. 16 is a front view of the pivot assembly of FIG. 2 used to mount a shower door of FIG. 13, wherein the shower door is in a maximally open position.

When the shower door 10 and the panel 15 are mounted via the pivot assembly 100 in either the non-overlapped or overlapped configurations, the shower door 10 may rotate freely (i.e., about the first pin connection 119 and the rotatable clamped coupling 103) and the panel 15 may be fixed (i.e., to the first and second fixtures 20 and 25). FIGS. 13-16 show front views of the shower door 10 and the panel 15 mounted via the pivot assembly 100, according to an exemplary embodiment. FIG. 13 illustrates the shower door 10 in a closed position relative to the panel 15. In various embodiments, an angle measured between a plane defined by the panel 15 and a plane defined by the shower door 10 is approximately zero when the shower door 10 is in a closed position. FIGS. 14 and 15 illustrate intermediate positions of the shower door 10, wherein the shower door 10 is disposed between a closed position (such as in FIG. 13) and a maximally open position. As the shower door 10 is opened, as shown in FIGS. 14 and 15, the angle between the plane defined by the panel 15 and the plane defined by the shower door 10 increases. When the shower door 10 is disposed in a maximally open position, the angle between the plane defined by the shower door 10 and the plane defined by the panel 15 is greatest. In various embodiments, the angle between the plane defined by the panel 15 and the plane defined by the shower door 10 may be approximately 90 degrees when the shower door 10 is in a fully opened positioned. In other embodiments, the shower door 10 may open to an angle of approximately 105 degrees. In various embodiments, the header connection hub 105 may include one or more dampers or damping mechanisms, which may facilitate controlling an amount (i.e., angle of rotation) and/or speed of rotation of the shower door 10.

Figure 17:
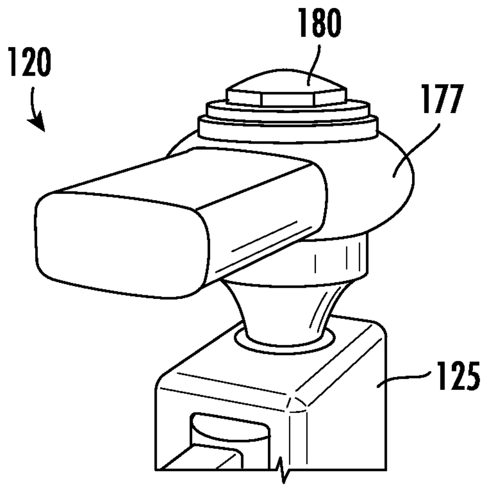
FIGS. 17-20 are cross-sectional views of the stabilizer bar of the pivot assembly of FIG. 2 illustrating various contours of the stabilizer bar, according to various exemplary embodiments.
Figure 18:
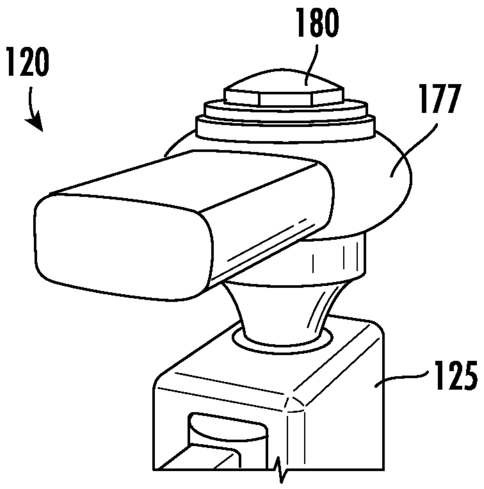
Figure 19:
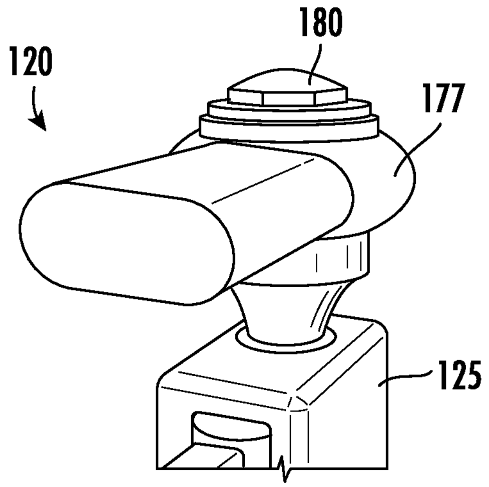
Figure 20:
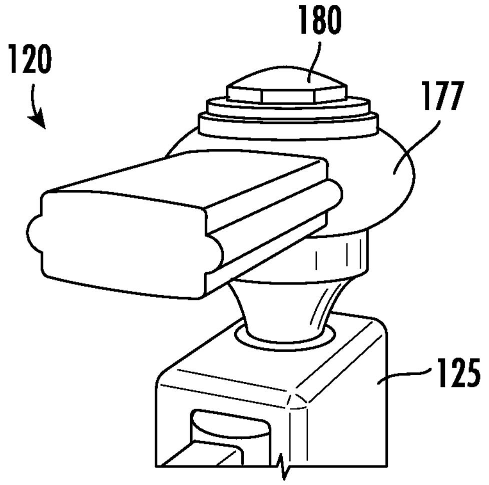

Various components of the pivot assembly 100 may be shaped to accommodate various aesthetic preferences. FIGS. 17-20 show partial cross-sectional views of the pivot assembly 100 taken along a length of linkage 120. As illustrated, the linkage 120 may be configured to have various widths, thicknesses, degrees of curvature, etc. Specifically, as shown in FIGS. 17-19, the linkage 120 may be configured to have increased or decreased thickness in at least one of a horizontal or vertical direction. The linkage 120 may additionally or alternatively be configured to have sharper or rounder edges. In various embodiments, the linkage 120 may include various ridges, bevels, chamfers, etc. As shown in FIG. 20, the linkage 120 may include one or more longitudinal ridges disposed along the length of the linkage 120.

Figure 21A:
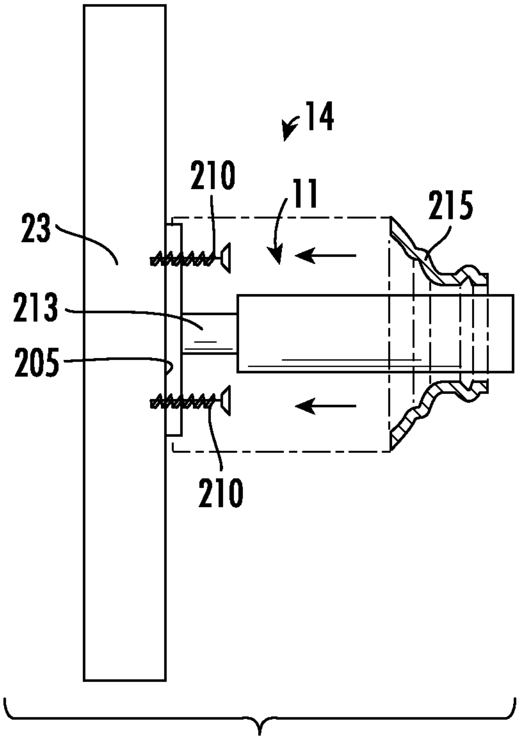
FIG. 21A is a side exploded view of a mounting assembly of the shower door system of FIG. 1, according to an exemplary embodiment.
Figure 21B:
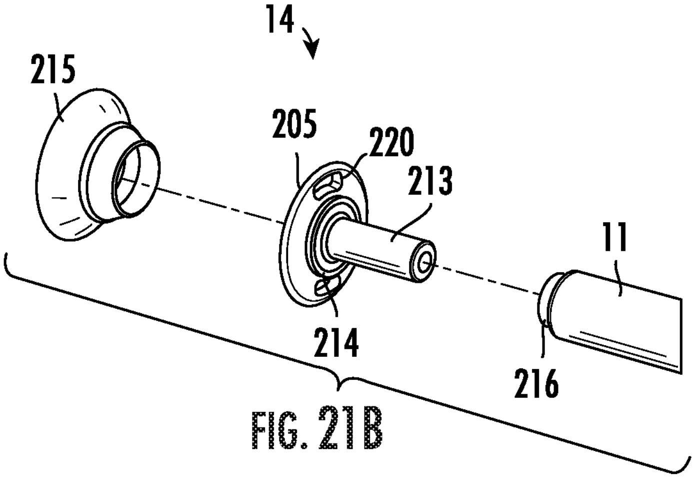
FIG. 21B is a perspective exploded view of the mounting assembly of the shower door system of FIG. 1, according to an exemplary embodiment.

As previously described, the pivot assembly 100 enables mounting the shower door 10 and the panel 15 to one or more fixtures (e.g., fixtures 20, 23, 25) within a shower space via the header rod 11. Also as previously described, the header rod 11 is fixedly coupled between parallel fixtures within the shower space (e.g., fixtures 20 and 23) via the mounting assemblies 14. FIG. 21A shows a side exploded view of one of the mounting assemblies 14. As shown, the mounting assembly 14 includes a mounting plate 205, which is configured to be fixedly coupled to a fixture (e.g., third fixture 23) via one or more fasteners 210 (e.g., nails, screws, etc.). The mounting plate 205 is configured to couple to a cover 215 (e.g., escutcheon cover), wherein the cover 215 may encase the mounting plate 205 therein. The cover 215 may include a central bore, which may be configured to slidably engage with the header rod 11 such that the cover 215 may freely slide along the header rod 11 until the cover 215 is coupled to the mounting plate 205. As shown in FIG. 21B, which illustrates a perspective exploded view of the mounting assembly 14, the mounting plate 205 may include a post 213 coupled to or integrally formed within a center portion of the mounting plate 205. In various embodiments, the post 213 may be configured to concentrically fit within the header rod 11 to facilitate positioning and coupling of the header rod 11 to the mounting plate 205. In other embodiments, the mounting plate 205 may include one or more threads 214 (or grooves or ridges), which are configured to engage with corresponding threads 216 at an end of the header rod 11.

Figure 22:
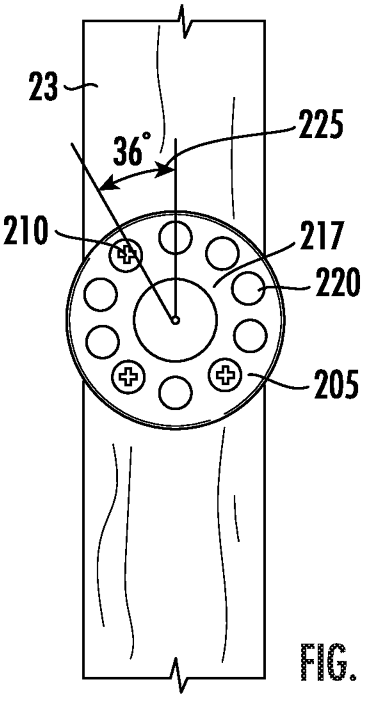
FIG. 22 is a front view of a mounting plate of the mounting assembly of the shower door system of FIG. 1, according to an exemplary embodiment.

FIG. 22 shows a front view of the mounting plate 205 coupled to the fixture 23, according to an exemplary embodiment. Alternatively, as illustrated in FIG. 22, the post 213 may be separate from the mounting plate 205 and configured to couple to the header rod 11. In other embodiments, the post 213 may be integrally formed with the header rod 11. Accordingly, the mounting plate 205 may include a central bore or recess 217, which may be configured to receive the post 213. In various embodiments, the bore or recess 217 is configured to structurally support the post 213 of the header rod 11. In addition, the mounting plate 205 may include a plurality of holes 220, through which the one or more fasteners 210 may be inserted for coupling to the fixture 23. In various embodiments, the mounting plate 210 may include up to 10 holes 220. In various embodiments, the mounting plate 210 may include more than 10 holes 220. In various embodiments, each of the holes 220 may be radially spaced in equal intervals within the mounting plate 205 such that an angle 225 between adjacent holes is the same or approximately the same. In various embodiments, the angle 225 between adjacent holes 220 may be 36°. In various embodiments, each of the holes 220 may be unequally spaced within the mounting plate 205.

Figure 23:
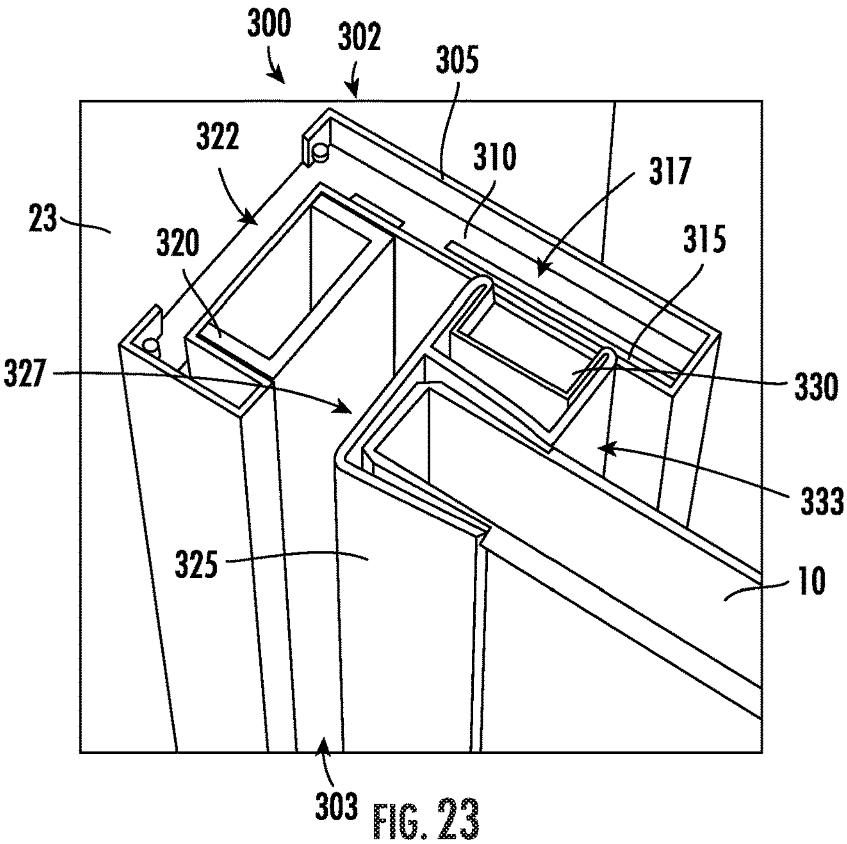
FIG. 23 is a top perspective view of a door seal assembly of the shower door system of FIG. 1, according to an exemplary embodiment.
Figure 24:
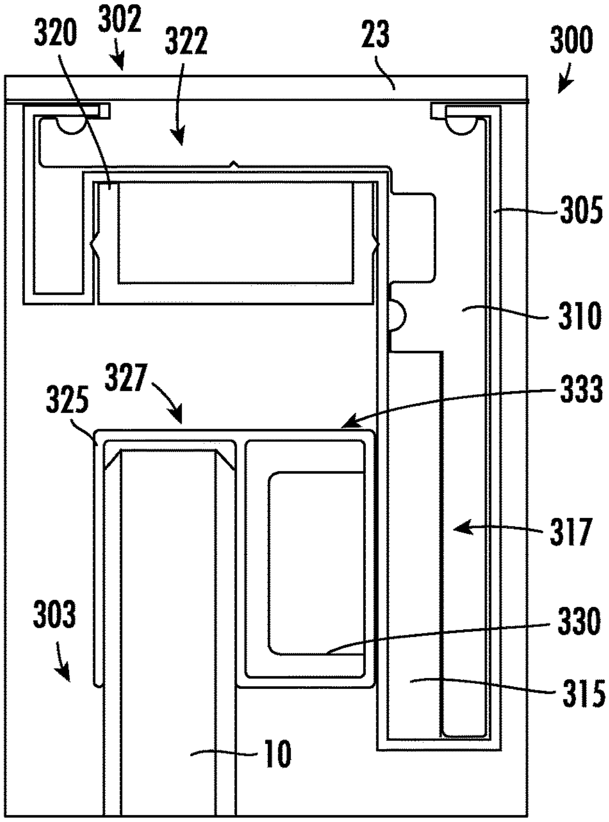
FIG. 24 is a top view of the door seal assembly of FIG. 24, according to an exemplary embodiment.

In various embodiments, the shower door system 5 includes a door seal assembly. FIGS. 23 and 24 show a door seal assembly 300 included within the shower door system 5. As shown, the door seal assembly 300 includes a first portion 302 and a second portion 303 configured to couple to the first portion 302. The first portion 302 is configured to couple to a fixture, such as the third fixture 23. The first portion 302 includes a frame or sheath 305, which extends longitudinally along the fixture and has a length that is substantially the same as the door 10. The first portion 302 is further configured to enclose a non-magnetic structural extrusion 310. In various embodiments, the sheath 305 is not magnetic. In some embodiments, the sheath 305 may be magnetic (i.e., including one or more magnetic materials, such as steel). As shown, the structural extrusion 310 has a shape that generally complements a shape of the sheath 305. The structural extrusion 310 includes a first recess 317, which is configured to receive a magnetic plate 315 ("first magnetic member"). In various embodiments, the magnetic plate 315 may be an iron plate to ensure that the plate can be adsorbed with magnetic seals at any location. In other embodiments, the magnetic plate 315 may be a steel plate or a steel alloy plate. The structural extrusion 310 and the sheath 305 include a second recess 322, which are configured to receive a spacer 320. In various embodiments, the spacer 320 is generally rectangular and may include or consist of one or more plastics.

The second portion 303 is configured to couple to the shower door 10 and is configured to be releasably couplable to the first portion 302 to facilitate water containment and increase safety of a user using the shower door system 5. The second portion 303 includes a seal 325, which is configured to extend along an edge of the door 10 closest and parallel to the fixture (i.e., closest and parallel to the third fixture 23). In various embodiments, the seal 325 includes one or more plastics or polymers. The seal 325 is configured to engage with the first portion 302 to prevent water from flowing out of the shower area contained by the shower door system 5. As shown, the seal 325 includes a first recess 327, which is configured to receive the edge of the door closest and parallel to the fixture. The seal 325 further includes a longitudinal channel 333, which is configured to receive and contain a magnetic strip 330 ("second magnetic member"). The magnetic strip 330 is configured to facilitate releasable coupling of the second portion 303, and thus the door 10, to the first portion 302. Accordingly, during use, the door seal assembly 300 facilitates closure, water containment, and safety of the shower door system 5.

Figure 25:
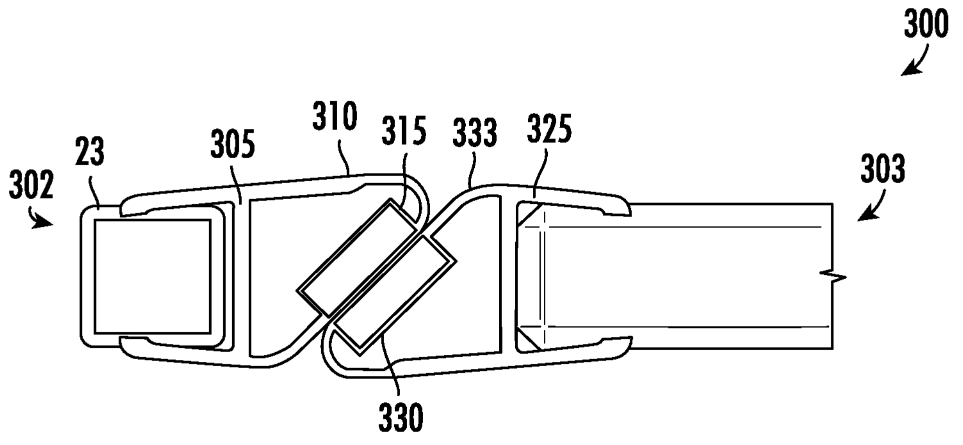
FIG. 25 is a top view of a door assembly for the shower door system of FIG. 1, according to an exemplary embodiment.

In other embodiments, such as shown in FIG. 25, the door seal assembly 300 may be configured such that ends of each of the respective structural extrusion 310 of the first portion 302 and the channel 333 of the second portion 303 are angled. In such a configuration, the ends of each of the first and second portions 302 and 303 may engage along an inclined interface, and along which the magnetic plate 315 and the magnetic strip 333 may couple the respective first and second portions 302, 303 together.

Figure 26:
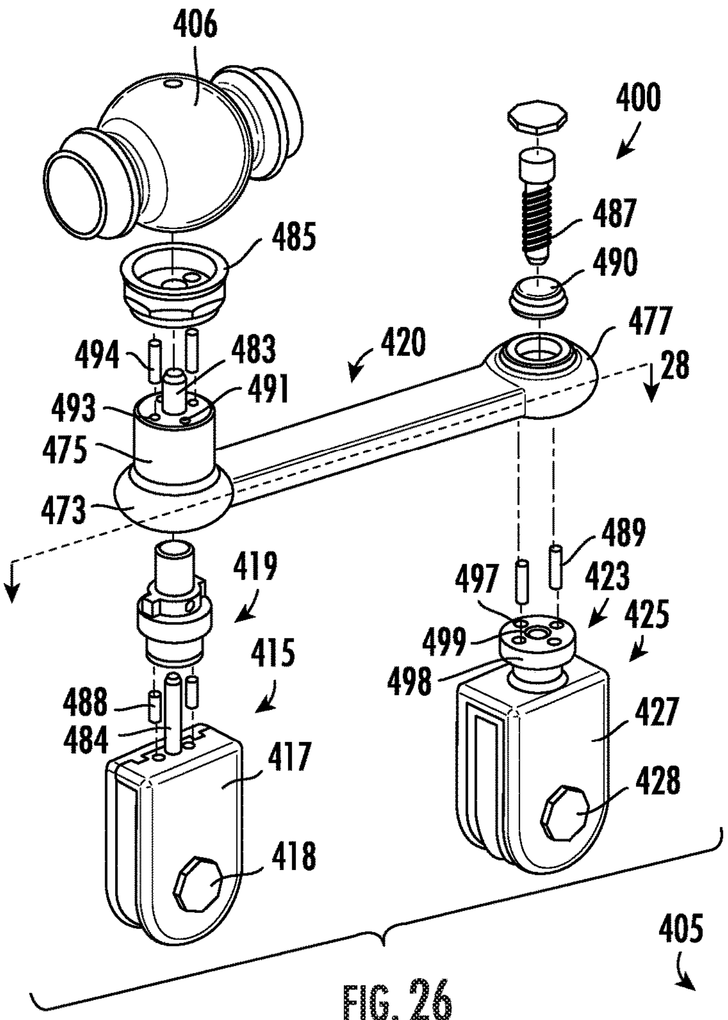
FIG. 26 is an exploded perspective view of a pivot assembly for a shower door system, according to an exemplary embodiment.

In various embodiments, the pivot assembly may be configured to have locking components, which may be specific to or shared between overlapping and adjacent configurations. FIG. 26 a perspective exploded view of a pivot assembly 400, according to an exemplary embodiment. Elements 405-477 of the pivot assembly 400 may be respectively similar or equivalent to elements 105-177 of the pivot assembly 100. As shown, the elongated portion 475 of the first end 473 of the linkage 420 forms a cylindrical projection extending upward toward the header connection hub 405. The elongated portion 475 includes a central bore 491, which is configured to receive and rotate about a pin 483. The pin 483 extends through the bore 491 and couples to the first pin connection 419 to facilitate rotation of the linkage 420 relative to the clamp 415 and the header connection hub 405. As shown, a top surface of the elongated portion 475 includes a plurality of apertures 493 arranged radially about the bore 491. Although FIG. 26 shows four apertures 493, various embodiments of the linkage 420 may include any number of aperture 493. The linkage 420 may be coupled to a fitting 485 (e.g., bearing) by inserting (e.g., threading) one or more fasteners 494 into the apertures 493. In various embodiments, the elongated portion 475 includes four apertures, where two of the four apertures 493 are configured to receive the fasteners 494, and where which two of the four apertures 493 receive the fasteners 494 is based on a configuration of the pivot assembly 400 (e.g., adjacent, overlapping, left, right).

The pin connection 419, which receives the pin 483 at a first end, also receives a pin 484 at a second end, the second end being adjacent the clamp 415. As shown, the pin 484 may extend upward from the clamp portion 417, where it is received within the pin connection 419. The pin connection 419 is further coupled to the clamp 415 via one or more fasteners 488. In various embodiments, the pin connection 419 is coupled to the clamp 415 via two fasteners 488.

The second end 477 of the linkage 420 is coupled to the clamp 425 via the pin connection 423. As shown, the connection 423 includes a knob portion 498, which has a central bore 499. The knob portion 498 also includes a plurality of apertures 497 disposed within a top surface of the knob portion 498 and arranged radially about the bore 499, where the apertures 497 are configured to receive fasteners 489, which couple the clamp 425 to the second end 477 of the linkage 420. In some embodiments, the pin connection 423 includes four apertures 497, where two of the four apertures 497 are configured to receive the fasteners 489, and where which two of the four apertures 497 receive the fasteners 489 is based on a configuration of the pivot assembly 400 (e.g., adjacent, overlapping, left, right). As shown, the pin connection 423 couples to a bottom portion of the second end 477 of the linkage 420. A pin 487 may be inserted through a top portion of the second end 477, where the pin 487 extends through the second end 477 and is received within the bore 499 of the pin connection 423.

Figure 27:
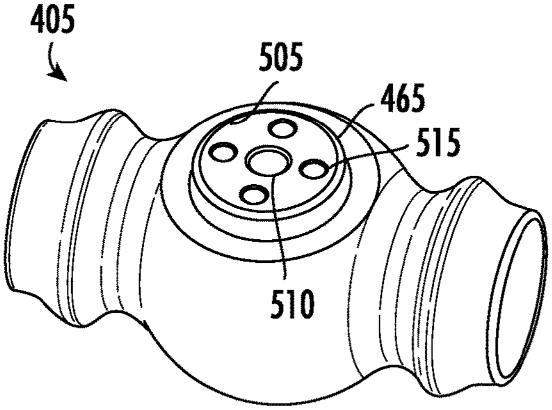
FIG. 27 is a bottom perspective view of the header connection hub within the pivot assembly of FIG. 26, according to an exemplary embodiment.

As shown in FIG. 27, a bottom portion of the header connection hub 405 includes the connection portion 465, which is configured to couple to the fitting 485. As shown, the connection portion 465 includes a surface 505 having a plurality of apertures 515, which are configured to receive the fasteners 494. In various embodiments, the connection portion 465 includes four apertures 515, where two of the four apertures 515 are configured to receive the fasteners 494, and where which two of the four apertures 515 receive the fasteners 494 is based on a configuration of the pivot assembly 400 (e.g., adjacent, overlapping, left, right). As shown, the connection portion 465 also includes a central aperture or bore 510, which is configured to receive a portion of the pin 483 to facilitate rotation of the linkage 420 relative to the header connection hub 405. As illustrated, the apertures 515 may be arranged radially about the bore 510.

Figure 28:
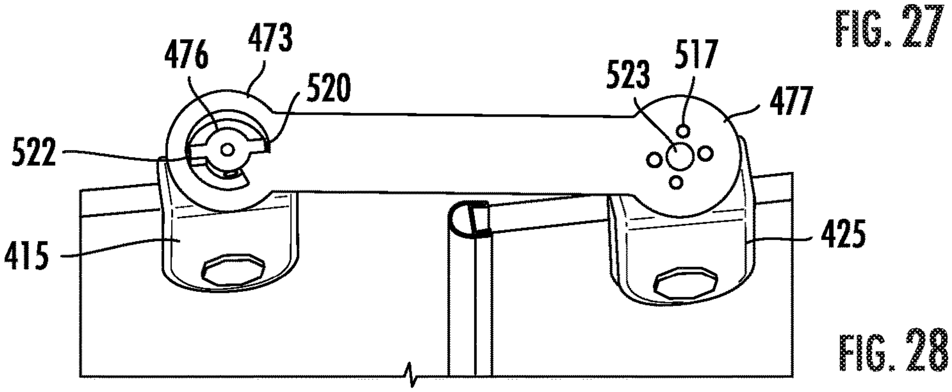
FIG. 28 is cross-sectional view of the pivot assembly of FIG. 26, taken along line 28-28 of FIG. 26, according to an exemplary embodiment.

In various embodiments, the linkage 420 may include one or more locating features, which facilitate coupling of the linkage 420 to the pin connection 419 and the clamp 415. As shown in FIG. 28, a bottom portion of the first end 473 of the linkage 420 may include a contoured recess 520, which has a complementary shape to a shape of the pin connection 419. In various embodiments, the recess 520 includes one or more notches 522, which may engage with one or more protruding features of the pin connection 419 to limit or prevent rotation of the linkage 420 relative to the pin connection 419. In addition, as shown, the second end 477 of the linkage 420 includes apertures 517, which are configured to receive the fasteners 489. In various embodiments, the second end 477 includes four apertures 517, where two of the four apertures 517 are configured to receive the fasteners 489, and where which two of the four apertures 517 receive the fasteners 589 is based on a configuration of the pivot assembly 400 (e.g., adjacent, overlapping, left, right). As shown, the second end 477 also includes a central aperture or bore 523, which is configured to receive a portion of the pin 487 to facilitate rotation of the linkage 420 relative to clamp 425.

Figure 29:
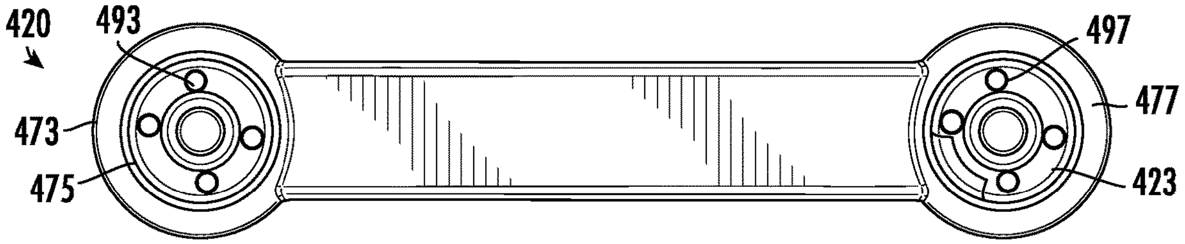
FIG. 29 is a bottom view of the linkage of FIG. 28 coupled to a pivot shaft, according to an exemplary embodiment.

As described previously, coupling of the linkage 420 to the clamps 415, 425 and to the header connection hub 405 is facilitated by coupling of one or more fasteners within apertures disposed within the pin connection 419, the elongated portion 475, and the pin connection 423. FIG. 29 shows a top view of the linkage 420 coupled to the pin connection 423. As shown, the elongated portion 475 at the first end 473 of the linkage and the pin connection 423 coupled to the second end 477 of the linkage 420 may each include four apertures disposed therein. The elongated portion 475 may include four apertures 493 and the pin connection 423 (coupled to the second end 477) includes four apertures 497, where two of each of the respective four apertures 493 and the four apertures 497 may be coupled using fasters (i.e., fasteners 489 and 494). In various embodiments, a first pair of each of the four apertures 497 and of the four apertures 493 may correspond to a first configuration of the pivot assembly 400 and a second pair of each of the four apertures 497 and of the four apertures 493 may correspond to a second configuration of the pivot assembly 400. For example, the first pair of apertures may correspond to a right-handed configuration of the pivot assembly 400, where the door 10 may be configured to rotate in a rightward direction, and the second pair of apertures may correspond to a left-handed configuration of the pivot assembly 400, where the door 10 may be configured to rotate in a leftward direction.

Figure 30:
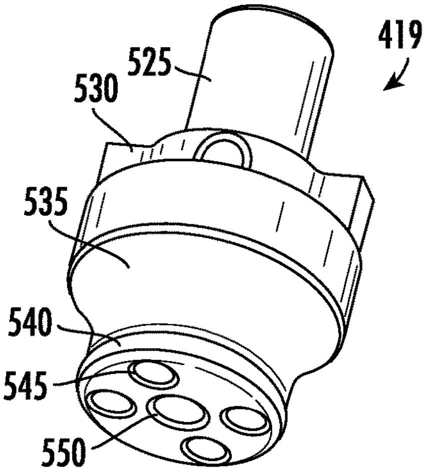
FIG. 30 is a perspective view of the pivot shaft of FIG. 29, according to an exemplary embodiment.

In addition, the pin connection 419 may be coupled within the pivot assembly 400 based on a configuration of the pivot assembly 400. As shown in FIG. 30, a bottom portion 540 of the pin connection 540 includes four apertures 545 disposed therein. Accordingly, two of the four apertures 545 may engage with the fasteners 488 to facilitate coupling of the pin connection 419 to the clamp 415. In various embodiments, a first pair of each of the four apertures 545 may correspond to a first configuration of the pivot assembly 400 and a second pair of each of the four apertures 545 and of the four apertures 493 may correspond to a second configuration of the pivot assembly 400. For example, the first pair of apertures may correspond to a right-handed configuration of the pivot assembly 400, where the door 10 may be configured to rotate in a rightward direction, and the second pair of apertures may correspond to a left-handed configuration of the pivot assembly 400, where the door 10 may be configured to rotate in a leftward direction. The bottom portion 540 of the pin connection 419 may be disposed adjacent an intermediate base section 535. The base section 535, as shown in FIG. 30, may be frustoconical in shape. A top portion of the base section 535 may be coupled to or integrally formed with a flange 530, which includes one or more wings or protrusions extending outwardly from a central axis of the pin connection 419. The flange 53 may be configured to engage with the one or more notches 522 in the recess 520 of the first end 473 when the linkage 420 is coupled to the pin connection 419. Finally, a tubular portion 525 of the pin connection 419 may be coupled to or integrally formed with the flange 530 and may extend upward toward the first end 473, where the tubular portion 525 is configured to be received within a bottom portion of the first end 473 to facilitate coupling of the linkage 420 to the clamp 415.

Figure 31A:
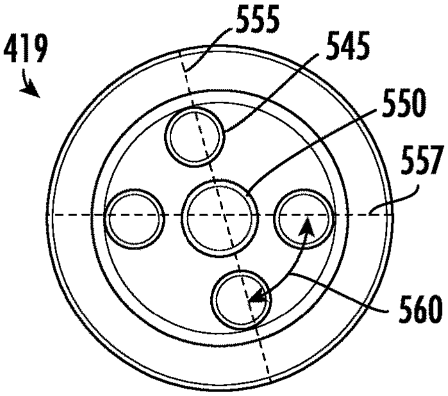
FIGS. 31A-B are end views of a pivot shaft having different aperture configurations, according to various exemplary embodiments.
Figure 31B:
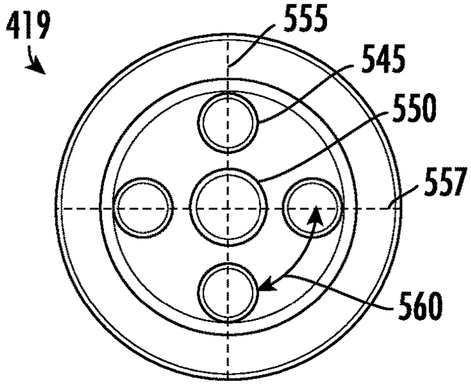

In various embodiments, an angular spacing between the apertures 545 within the pin connection 419 (and/or within the pin connection 423, the elongated portion 475, and the hub 405) may be arranged based on a configuration of the pivot assembly 400. For example, as shown in FIG. 31A, the apertures 545 within the pin connection 419 may be arranged such that a first pair of apertures 545 are aligned along a first axis 555 and a second pair of apertures 545 are aligned along a second axis 557, where the first axis 555 and the second axis 557 are offset by an angle 560. In various embodiments, the angle 560 may have a first value corresponding to an overlapping configuration of the pivot assembly 400. In some embodiments, the angle 560 may have a second value corresponding to an adjacent configuration of the pivot assembly 400. In some embodiments, the first value may be less than the second value. In other embodiments, the first value may be less than 90 degrees and the second value may be approximately 90 degrees.

Notwithstanding the embodiments described above and shown in FIGS. 1-31, various modifications and inclusions to those embodiments are contemplated and considered within the scope of the present disclosure.

As utilized herein with respect to numerical ranges, the terms “approximately,” “about,” “substantially,” and similar terms generally mean+/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the damping mechanisms of the exemplary embodiment described herein may be incorporated in the header connection hub 105 of the exemplary embodiment described herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A pivot assembly for a shower door, the pivot assembly comprising:
- a hub;
- a linkage having a first end and second end, wherein the first end is configured to couple to the hub, and wherein a bottom portion of the first end comprises a recess;
- a first pin connection coupled to a first clamp and received by the recess of the linkage to couple to the first end of the linkage; and
- a second pin connection coupled to the second end of the linkage and to a second clamp;
- wherein each of the first pin connection and the second pin connection include a plurality of apertures, and wherein a configuration of the plurality of apertures is based on a configuration of the pivot assembly.

2. The pivot assembly of claim 1, wherein the plurality of apertures comprises four apertures.

3. The pivot assembly of claim 2, wherein two of each of the four apertures are configured to respectively receive a fastener.

4. The pivot assembly of claim 2, wherein the four apertures are arranged in two pairs, wherein a first of the two pairs are aligned along a first axis and a second of the two pairs are aligned along a second axis.

5. The pivot assembly of claim 4, wherein an angle between the first axis and the second axis corresponds to the configuration of the pivot assembly.

6. The pivot assembly of claim 1, wherein the hub is configured to receive a rod, the rod configured to anchor the pivot assembly to a structure.

7. The pivot assembly of claim 1, wherein the first end of the linkage includes an elongated portion extending toward the hub, the elongated portion configured to couple to the bottom portion of the hub.

8. The pivot assembly of claim 7, further comprising one or more bearings disposed at a joint formed between the hub and the elongated portion.

9. The pivot assembly of claim 1, wherein the recess comprises one or more notches, wherein the one or more notches are configured to engage with a flange of the first pin connection.

10. A shower system comprising:
- a rod extending between a first structure and a second structure;
- a pivot assembly coupled to the rod, the pivot assembly comprising:
  - a hub;
  - a linkage having a first end and second end, wherein the first end is configured to couple to the hub;
  - a first pin connection coupled to the first end of the linkage and to a first clamp; and
  - a second pin connection coupled to the second end of the linkage and to a second clamp;
- a panel coupled to the first structure and to the second clamp; and
- a door coupled to the first clamp, where the door is configured to pivot relative to the panel.

11. The shower system of claim 10, wherein the panel is coupled to the first structure along a first edge and to the second clamp along a second edge, and wherein the first edge is disposed substantially perpendicular to the second edge.

12. The shower system of claim 10, wherein the pivot assembly is configurable according to a first configuration or a second configuration, wherein when the pivot assembly is in the first configuration a third edge of the panel opposite the first edge of the panel at least partially overlaps a first edge of the door, and wherein when the pivot assembly is in the second configuration the third edge of the panel is disposed adjacent to the first edge of the door.

13. The shower system of claim 12, wherein each of the first pin connection and the second pin connection include a plurality of apertures, and wherein a configuration of the plurality of apertures is based on whether the pivot assembly is configured in the first configuration or the second configuration.

14. The shower system of claim 13, further comprising a seal assembly, the seal assembly having a first portion coupled to a second edge of the door opposite the first edge of the door and a second portion coupled to the first second structure.

15. The shower system of claim 14, wherein the first portion comprises a first magnetic member and the second portion comprises a second magnetic member, wherein the first magnetic member is configured to couple to the second magnetic member.

16. The shower system of claim 10, wherein the rod comprises a first portion and a second portion, the first portion being coupled to a first connection on the hub and the second portion being coupled to a second connection on the hub.

17. The shower system of claim 16, further comprising a mounting plate configured to couple to the first structure, wherein the first portion of the rod is configured to couple to the mounting plate.

18. The shower system of claim 17, wherein the mounting plate comprises a post, wherein the post is received by an end of the first portion of the rod.

19. The shower system of claim 18, further comprising a cover, the cover configured to enclose the mounting plate.

20. A shower system comprising:

a rod extending between a first structure and a second structure; and a pivot assembly coupled to the rod, the pivot assembly comprising:

a hub;

a linkage having a first end and second end, wherein the first end is configured to couple to the hub;

a first pin connection coupled to the first end of the linkage and to a first clamp; and a second pin connection coupled to the second end of the linkage and to a second clamp.

* * * * *